United States Patent
Shapir (10) Patent No.: US 10,384,278 B2
(45) Date of Patent: Aug. 20, 2019

(54) SQUARE-SHAPED CUTTING INSERT HAVING CURVED SECONDARY AND CORNER CUTTING EDGES, AND ROTARY CUTTING TOOL

(71) Applicant: Iscar, Ltd., Tefen (IL)

(72) Inventor: Adi Shapir, Haifa (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/727,770

(22) Filed: Oct. 9, 2017

(65) Prior Publication Data

US 2019/0105718 A1 Apr. 11, 2019

(51) Int. Cl.
*B23C 5/20* (2006.01)
*B23C 5/22* (2006.01)
(Continued)

(52) U.S. Cl.
CPC .............. *B23C 5/2221* (2013.01); *B23C 5/02* (2013.01); *B23C 5/207* (2013.01); *B23C 5/26* (2013.01);
(Continued)

(58) Field of Classification Search
CPC ........ B23C 2200/203; B23C 2200/201; B23C 2200/208; B23C 2200/20;
(Continued)

(56) References Cited

U.S. PATENT DOCUMENTS

| 3,381,349 A | 5/1968 | Newcomer |
| 4,681,488 A * | 7/1987 | Markusson ............ B23C 5/202 407/113 |

(Continued)

FOREIGN PATENT DOCUMENTS

| JP | H08 108310 | 4/1996 |
| JP | 2005 169511 | 6/2005 |
| WO | WO 2016/039347 | 3/2016 |

OTHER PUBLICATIONS

International Search Report dated Feb. 4, 2019, issued in PCT counterpart application (No. PCT/IL2018/051028).
(Continued)

*Primary Examiner* — Willmon Fridie, Jr.
(74) *Attorney, Agent, or Firm* — Womble Bond Dickinson (US) LLP (57) ABSTRACT

An indexable cutting insert has upper and lower surfaces with a peripheral surface extending therebetween and having four side surfaces alternating with four corner surfaces. The side and corner surfaces intersect the upper surface to form side and corner cutting edges, respectively. Each side cutting edge includes a primary cutting edge adjoining one of the corner cutting edges at a first endpoint and a secondary cutting edge adjoining another one of the corner cutting edges at a second endpoint. In a top view, the four primary cutting edges define an imaginary first square, each primary cutting edge is tangential to its adjoining corner cutting edge, and each secondary cutting edge is curved and entirely located in one of four imaginary quadrants. The insert is removably secured in a rotary cutting tool such that one of the secondary cutting edges contains the axially forward-most point of the insert's upper peripheral edge.

25 Claims, 7 Drawing Sheets

(51) Int. Cl.
*B23C 5/02* (2006.01)
*B23C 5/26* (2006.01)

(52) U.S. Cl.
CPC ............. *B23C 2200/0455* (2013.01); *B23C 2200/0461* (2013.01); *B23C 2200/125* (2013.01); *B23C 2200/203* (2013.01); *B23C 2200/208* (2013.01); *B23C 2200/243* (2013.01); *B23C 2200/366* (2013.01); *B23C 2210/168* (2013.01)

(58) Field of Classification Search
CPC .... B23C 2200/0455; B23C 2200/0461; B23B 2200/202; B23B 2200/201; B23B 2200/208; B23B 2200/0471; B23B 2200/0478
See application file for complete search history.

(56) References Cited

U.S. PATENT DOCUMENTS

| | | | | |
|---|---|---|---|---|
| 4,963,061 | A * | 10/1990 | Katbi | B23B 27/143 407/113 |
| 5,032,049 | A | 7/1991 | Hessman et al. | |
| 5,282,703 | A | 2/1994 | Itaba et al. | |
| 5,544,984 | A * | 8/1996 | Pantzar | B23C 5/207 407/113 |
| 5,720,583 | A | 2/1998 | Bohnet et al. | |
| 5,807,031 | A | 9/1998 | Arai et al. | |
| 5,810,521 | A * | 9/1998 | Pantzar | B23B 27/145 407/114 |
| 5,947,651 | A | 9/1999 | Murakami et al. | |
| 5,971,672 | A | 10/1999 | Hansson | |
| 6,039,515 | A * | 3/2000 | Lamberg | B23B 27/141 407/113 |
| 6,152,658 | A | 11/2000 | Satran et al. | |
| 6,196,771 | B1 | 3/2001 | Andersson | |
| 6,244,791 | B1 * | 6/2001 | Wiman | B23B 27/141 407/114 |
| 6,669,412 | B1 * | 12/2003 | Hirose | B23C 5/2221 407/113 |
| 6,802,676 | B2 | 10/2004 | Noggle | |
| 6,945,740 | B2 | 9/2005 | Svenningsson et al. | |
| 6,957,935 | B2 * | 10/2005 | Sung | B23C 5/202 407/113 |
| 7,220,083 | B2 | 5/2007 | Festeau et al. | |
| 7,351,017 | B2 * | 4/2008 | Kruszynski | B23B 51/048 408/223 |
| 2010/0150671 | A1 | 6/2010 | Oprasic et al. | |
| 2012/0070242 | A1 | 3/2012 | Choi et al. | |
| 2013/0129430 | A1 | 5/2013 | Bhagath et al. | |
| 2014/0341660 | A1 | 11/2014 | Cheon | |
| 2016/0158854 | A1 * | 6/2016 | Ishi | B23C 5/207 409/131 |
| 2017/0320143 | A1 * | 11/2017 | Lof | B23B 27/141 |

OTHER PUBLICATIONS

Written Opinion dated Feb. 4, 2019, issued in PCT counterpart application (No. PCT/IL2018/051028).

* cited by examiner

SQUARE-SHAPED CUTTING INSERT HAVING CURVED SECONDARY AND CORNER CUTTING EDGES, AND ROTARY CUTTING TOOL

FIELD OF THE INVENTION

The present invention relates to a rotary cutting tool and an indexable cutting insert which in a top view of its top surface is generally square-shaped. The tool and insert are for use in metal cutting processes in general, and for milling operations with high feed rates in particular.

BACKGROUND OF THE INVENTION

Within the field of cutting tools used in milling operations with high feed rates, there are many examples of generally square-shaped single-sided indexable cutting inserts having four primary or major cutting edges, in a top view of their top surface.

U.S. Pat. No. 6,945,740 in its FIGS. 4 to 8, discloses a single-sided indexable cutting insert having a generally square shape in a top view. The insert includes first and second pairs of mutually parallel primary (major) cutting edges, four corners, and four secondary (wiper) edges. Each wiper edge is situated between a major cutting edge and a respective corner. The wiper edges are shorter than the major cutting edges and are inclined relative thereto, wherein an imaginary extension line of the wiper edge forms a first acute angle with the respective major cutting edge as the insert is viewed in a direction perpendicular to the top surface. The cutting seats are arranged to orient the inserts wherein an axially forwardmost wiper edge of each insert lies in a plane oriented perpendicular to the axis, and wherein a radially outermost wiper edge of each insert is oriented parallel to the axis.

U.S. Pat. No. 7,220,083 in its FIGS. 4A to 4C, discloses a single-sided indexable cutting insert having a generally square shape in a top view. The insert has four identical convex cutting edges connected by nose corners. Each of the four convex cutting edges includes a curved primary (major) cutting edge portion with a large curvature radius, and two straight secondary (minor) cutting edge portions. The curved major cutting edge portions are said to provide the cutting insert with favorable cutting edge strength. A conical clearance surface extends downward from each major cutting edge portion, and a planar clearance surface extends downward from each minor cutting edge portion. A plurality of cutting insert are arranged in pockets of a cutting body such that a minor cutting edge portion of each insert is perpendicular to the cutting axis to guarantee good surface finish on the machined surface.

U.S. Pat. No. 4,681,488 in its FIGS. 2 to 4, discloses a single-sided indexable cutting insert having a generally square shape in a top view. In this insert, each of the corner cutting edges comprises a plurality of straight cutting edge segments.

U.S. Pat. No. 5,807,031 in its FIGS. 16 and 24, discloses a double-sided indexable cutting insert having a generally square shape in a top view. The insert has straight primary cutting edges, both ends of which form angles with adjacent straight cutting edge segments belonging to secondary and/or corner cutting edges.

US 2012/0070242A1 in its FIG. 25, discloses a single-sided indexable cutting insert having a generally square shape in a top view. The insert has straight primary cutting edges which form an angle with adjacent straight secondary cutting edge segments.

U.S. Pat. No. 6,957,935 in its FIGS. 2 to 4, discloses a single-sided indexable cutting insert having a generally square shape in a top view. The insert has curved primary cutting edges connecting with adjacent straight secondary cutting edges, each secondary cutting edge basically functioning as a wiper in square shoulder milling operations to improve surface finish of a workpiece.

US 2014/0341660A1 in its FIG. 7, discloses a double-sided indexable cutting insert having a generally square shape in a top view. The insert has straight primary cutting edges which form an angle of less than 180° with adjacent straight secondary cutting edges ("wiper edges"), the wiper edges basically functioning to improve surface finish of a workpiece in square shoulder milling operations.

It is an object of the present invention to provide an economically efficient indexable cutting insert suitable for use in milling operations with high feed rates.

It is also an object of the present invention to provide a robust cutting insert with prolonged service life.

It is further an object of the present invention to provide an improved rotary cutting tool in which the indexable cutting insert is removably secured in a cutting body with a high level of stability.

SUMMARY OF THE INVENTION

In accordance with the present invention, there is provided an indexable cutting insert comprising:
  opposing upper and lower surfaces with a peripheral surface and an insert axis extending therebetween,
  the peripheral surface intersecting the upper surface to form a continuous upper peripheral edge, and including four insert side surfaces alternating with four corner surfaces,
    each insert side surface intersecting the upper surface to form a side cutting edge, and each corner surface intersecting the upper surface to form a curved corner cutting edge,
  wherein each side cutting edge includes a primary cutting edge adjoining one of the corner cutting edges at a first endpoint and a secondary cutting edge adjoining another one of the corner cutting edges at a second endpoint, and
  wherein in a top view of the cutting insert along the insert axis:
    the upper surface is square-shaped with each of the four primary cutting edges being straight, and the four primary cutting edges defining four sides of an imaginary first square,
    each primary cutting edge is tangential to its adjoining corner cutting edge, and
    each secondary cutting edge is continuously curved and entirely located in a corresponding one of four imaginary quadrants defined by two mutually perpendicular imaginary lines bisecting the imaginary first square's four sides.

Also in accordance with the present invention, there is provided a rotary cutting tool rotatable about a tool axis defining a forward-rearward rotation direction, and comprising a cutting body having at least one insert receiving pocket, and at least one cutting insert of the sort described above removably secured in the insert receiving pocket.

The continuously curved secondary cutting edges of the cutting insert in the present invention are configured to increase the strength of the side cutting edges, and provide a robust cutting insert with prolonged service life, suitable for use in milling operations with high feed rates.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

As shown in FIGS. 1 to 5, a first aspect of the present invention relates to an indexable cutting insert 20 having opposing upper and lower surfaces 22, 24 with a peripheral surface 26 and an insert axis A1 extending therebetween.

In some embodiments of the present invention the cutting insert 20 may be indexable about the insert axis A1.

Also in some embodiments of the present invention, the cutting insert 20 may preferably be manufactured by form pressing and sintering a cemented carbide, such as tungsten carbide, and may be coated or uncoated.

Further in some embodiments of the present invention, the insert's entire peripheral surface 26 may be devoid of ground surface portions of the sort resulting from grinding operations. As known to those skilled in the art, such ground surfaces are characterized by low surface roughness Ra values (e.g., Ra of 0.3 μm or less) not achievable by pressing and sintering.

It should be appreciated that peripheral grinding of a cutting insert is typically performed individually and can be time-consuming, and thus forgoing this manufacturing step can be economically beneficial.

Figure 2:
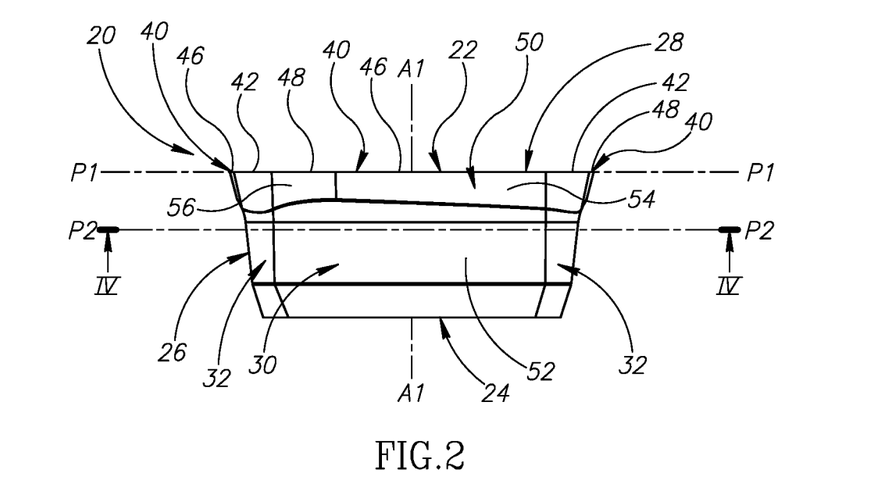
FIG. 2 is a side view of the cutting insert shown in FIG. 1.

As shown in FIG. 2, the lower surface 24 may be planar and perpendicular to the insert axis A1.

In other embodiments of the present invention, the lower surface 24 may include a plurality of coplanar lower sub-surfaces (not shown).

Figure 1:
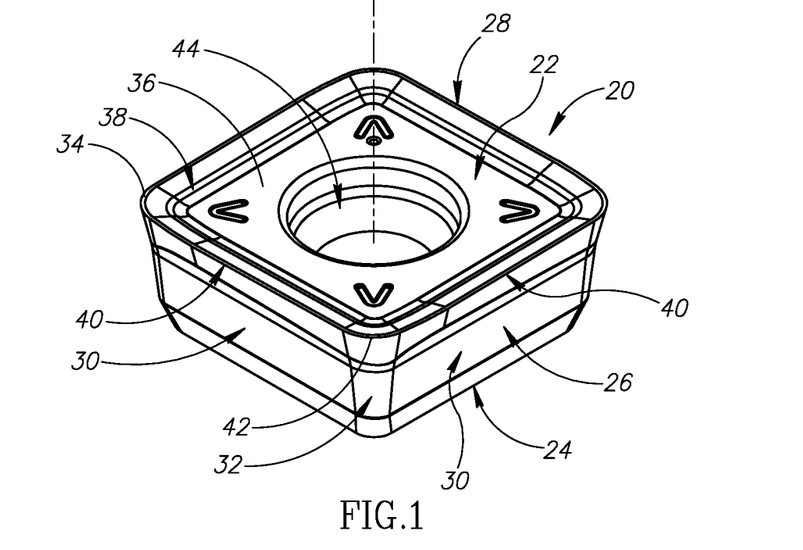
FIG. 1 is a perspective view of a cutting insert in accordance with some embodiments of the present invention.

As shown in FIGS. 1 and 2, the peripheral surface 26 intersects the upper surface 22 to form a continuous upper peripheral edge 28, and includes four insert side surfaces 30 circumferentially alternating with four insert corner surfaces 32.

In some embodiments of the present invention, the entire upper peripheral edge 28 may be contained in a first plane P1.

As shown in FIG. 2, the first plane P1 may be perpendicular to the insert axis A1.

In some embodiments of the present invention, the upper surface 22 may include a continuous land surface 34 intersecting the upper peripheral edge 28.

Also in some embodiments of the present invention, the upper surface 22 may include a planar central region 36 entirely located between the first plane P1 and the lower surface 24.

Further in some embodiments of the present invention, the upper surface 22 may include a continuous rake surface 38 extending between the land surface 34 and the central region 36.

As shown in FIGS. 1 and 2, each insert side surface 30 intersects the upper surface 22 to form a side cutting edge 40, and each insert corner surface 32 intersects the upper surface 22 to form a curved corner cutting edge 42.

In some embodiments of the present invention, the lower surface 24 may devoid of cutting edges, and the cutting insert 20 may be described a 'single-sided'. In other embodiments (not shown), the insert may have cutting edges on both the upper and lower surfaces 22, 24, and thus be described as 'double-sided'.

Also in some embodiments of the present invention, a through bore 44 coaxial with the insert axis A1 may intersect the upper and lower surfaces 22, 24.

Further in some embodiments of the present invention, the cutting insert 20 may exhibit four-fold rotational symmetry about the insert axis A1.

Figure 3A:
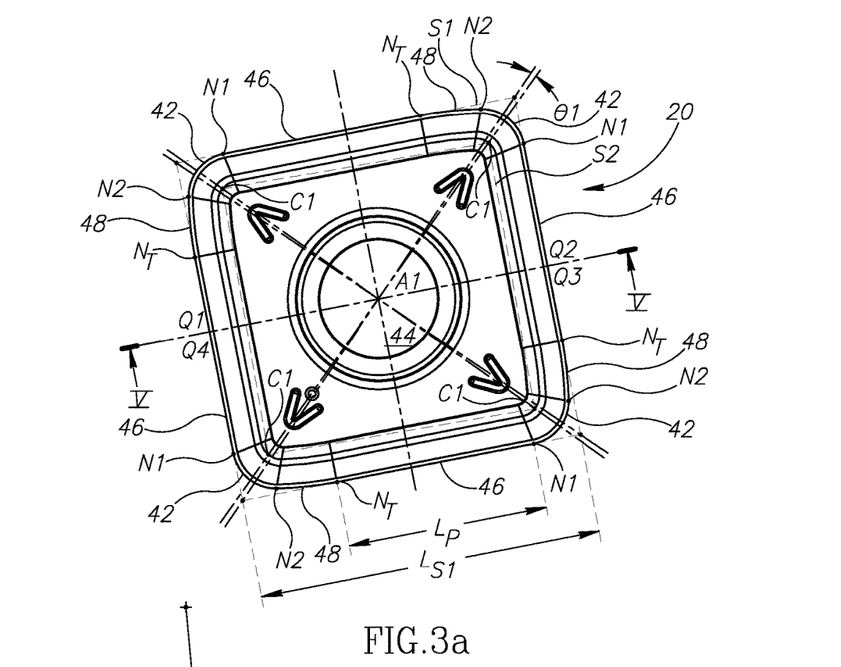
FIG. 3a is a top view of the cutting insert shown in FIG. 1.
Figure 3B:
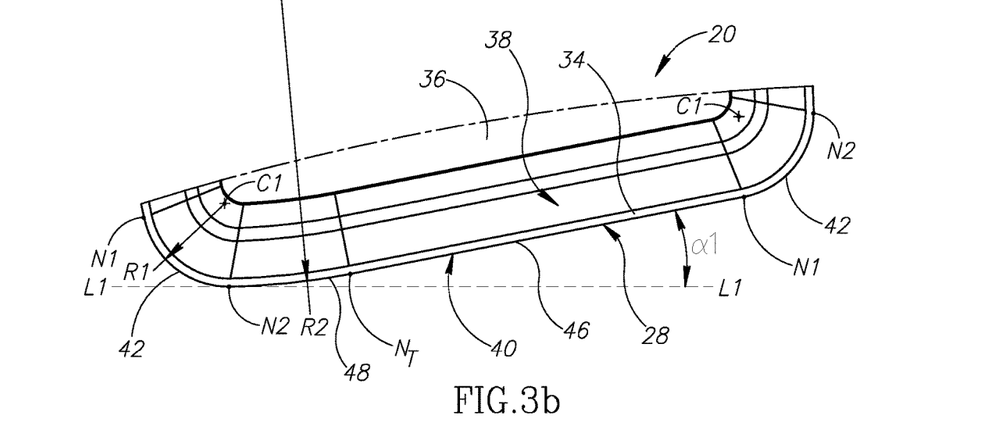
FIG. 3b is a detailed top view of the cutting insert shown in FIG. 1.

As shown in FIGS. 3a and 3b, each side cutting edge 40 includes a primary cutting edge 46 adjoining one of the corner cutting edges 42 at a first endpoint N1 and a secondary cutting edge 48 adjoining another one of the corner cutting edges 42 at a second endpoint N2.

According to the present invention, in a top view of the cutting insert 20 along the insert axis A1, as shown in FIG. 3a:

each of the four primary cutting edges 46 is straight, and the four primary cutting edges 46 define four sides of an imaginary first square S1, each primary cutting edge 46 is tangential to its adjoining corner cutting edge 42, and each secondary cutting edge 48 is continuously curved and entirely located in a corresponding one of four imaginary quadrants Q1, Q2, Q3, Q4 defined by two mutually perpendicular imaginary lines bisecting the imaginary first square's four sides.

It should be appreciated that in the top view of the cutting insert 20, each curved corner cutting edge 42 extends from an adjoining straight primary cutting edge 46 belonging to a first side cutting edge 40, to an adjoining continuously curved secondary cutting edge 48 belonging to a circumferentially adjacent second side cutting edge 40.

It should also be appreciated that in the present context, a "continuously curved" cutting edge is one that is devoid of discontinuities, such as those formed from linear segments which are angled with respect to one another.

In some embodiments of the present invention, the imaginary first square S1 may have its center point contained in the insert axis A1.

It should be appreciated that each secondary cutting edge 48 being continuously curved, increases the strength of the side cutting edges 40, thus providing a robust cutting insert 20 with prolonged service life, suitable for use in milling operations with high feed rates.

In the top view of the cutting insert 20, as shown in FIG. 3a, each primary cutting edge 46 may extend across two of the four imaginary quadrants Q1, Q2, Q3, Q4.

In some embodiments of the present invention, each primary cutting edge 46 may be straight, i.e. linear, in both the top view of the cutting insert 20 and also in a side view.

As seen in FIG. 2, in a side view of a given insert side surface 30, at least a portion of the primary cutting edge 46 associated with a circumferentially adjacent first insert side surface 30 is visible, and at least a portion of the secondary cutting edge 48 associated with a circumferentially adjacent second insert side surface 30 is visible, the first and second insert side surfaces 30 being opposite one another.

In the top view of the cutting insert 20, as shown in FIG. 3a, no portion of the upper peripheral edge 28 may extend outside the imaginary first square S1.

In some embodiments of the present invention, as shown in FIG. 3a, no portion of the cutting insert 20 may extend outside the imaginary first square S1.

As shown in FIGS. 3a and 3b, each corner cutting edge 42 may be continuously curved and have a constant first radius of curvature R1, and each continuously curved secondary cutting edge 48 may have a constant second radius of curvature R2.

In some embodiments of the present invention, the second radius of curvature R2 may be greater than the first radius of curvature R1.

Also in some embodiments of the present invention, the second radius of curvature R2 may be at least three times greater, and at most ten times greater, than the first radius of curvature R1, i.e. $3*R1 \leq R2 \leq 10*R1$.

In the top view of the cutting insert 20, as shown in FIG. 3a, each continuously curved corner cutting edge 42 may have a first radial center point C1, and the four first radial center points C1 may define four corners of an imaginary second square S2.

In some embodiments of the present invention, the imaginary second square S2 may have its center point contained in the insert axis A1.

As shown in FIG. 3a, by means of two pairs of mutually perpendicular imaginary lines intersecting the imaginary first and second square's four corners, the imaginary first square S1 may be rotationally offset from the imaginary second square S2 by a first offset angle θ1.

In some embodiments of the present invention, the first offset angle θ1 may be less than 5 degrees, i.e. $\theta1<5°$.

In the top view of the cutting insert 20, as shown in FIG. 3b, a first imaginary straight line L1 containing one of the second endpoints N2 may be tangential to both its associated secondary cutting edge 48 and also to the adjoining corner cutting edge 42.

It should be appreciated that the tangentiality of the first imaginary straight line L1 with respect to its associated secondary cutting edge 48 and the adjoining corner cutting edge 42 ensures a smooth transition therebetween, thus providing a robust cutting insert 20 with prolonged service life, suitable for use in milling operations with high feed rates.

As shown in FIG. 3b, the first imaginary straight line L1 may form an acute primary cutting angle α1 with the primary cutting edge 46 contained in the same side cutting edge 40 as its associated secondary cutting edge 48.

In some embodiments of the present invention, the primary cutting angle α1 may be at least 5 degrees and at most 15 degrees, i.e. $5° \leq \alpha1 \leq 15°$.

In the top view of the cutting insert 20, as shown in FIGS. 3a and 3b, each primary cutting edge 46 may tangentially adjoin the secondary cutting edge 48 contained in the same side cutting edge 40 at a transition point $N_T$.

As shown in FIG. 3a, each primary cutting edge 46 may have a primary cutting length $L_P$ and each side of the imaginary first square S1 may have a first side length Ls1.

In some embodiments of the present invention, the primary cutting length $L_P$ may be greater than half the first side length Ls1.

As shown in FIGS. 1 and 2, each insert side surface 30 may include an insert side relief surface 50 intersecting the upper surface 22, and an insert side abutment surface 52 between the insert side relief surface 50 and the lower surface 24.

In some embodiments of the present invention, each insert side relief surface 50 may include a primary relief surface 54 adjacent its associated primary cutting edge 46, and a secondary relief surface 56 adjacent its associated secondary cutting edge 48.

Also in some embodiments of the present invention, each primary relief surface 54 may be planar, and each secondary relief surface 56 may be convex.

Further in some embodiments of the present invention, each insert side abutment surface 52 may be planar.

Figure 4:
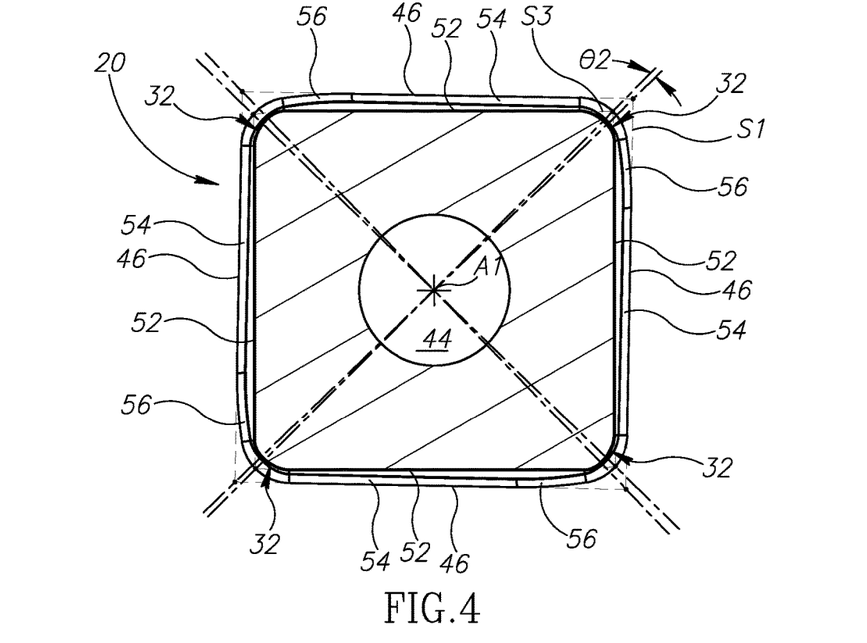
FIG. 4 is a cross-sectional view of the cutting insert shown in FIG. 2, taken along the line IV-IV.

As shown in FIG. 4, in a cross-section taken in a second plane P2 perpendicular to the insert axis A1 and intersecting the four insert side abutment surfaces 52, the four insert side abutment surfaces 52 may define four sides of an imaginary third square S3.

In some embodiments of the present invention, the imaginary third square S3 may have its center point contained in the insert axis A1.

In the cross-section taken in the second plane P2, as shown in FIG. 4, each insert side abutment surface 52 may intersect two circumferentially adjacent insert corner surfaces 32.

In some embodiments of the present invention, the second plane P2 may be located closer to the first plane P1 than to the lower surface 24.

As shown in FIG. 4, by means of two pairs of mutually perpendicular imaginary lines intersecting the imaginary first and third square's four corners, the imaginary first square S1 may be rotationally offset from the imaginary third square S3 by a second offset angle θ2.

In some embodiments of the present invention, the second offset angle θ2 may be less than 5 degrees, i.e. $\theta2<5°$.

It should be appreciated that for embodiments of the present invention in which the imaginary first square S1 is rotationally offset from the imaginary third square S3, a greater flexibility of design is provided for the cutting insert 20, allowing same size cutting inserts 20 to have different second offset angles θ2.

As shown in FIG. 4, the imaginary third square S3 may be entirely located inside the imaginary first square S1.

In some embodiments of the present invention, the second offset angle θ2 may be equal to the first offset angle θ1.

Also in some embodiments of the present invention, the imaginary second and third squares S2, S3 may be rotationally coincident, and the imaginary second square S2 may be entirely located inside the imaginary third square S3.

Figure 5:
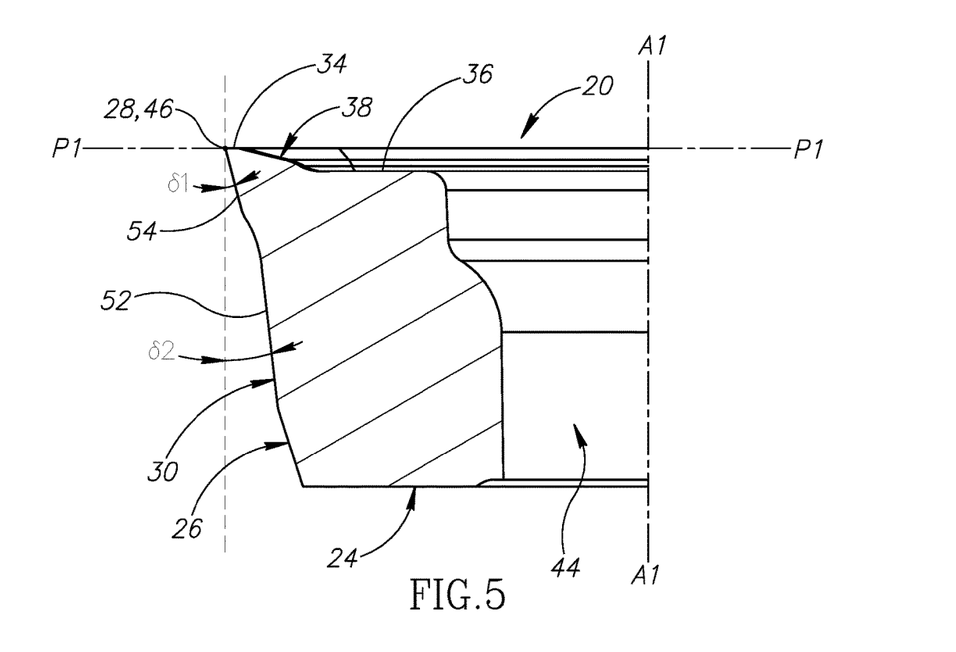
FIG. 5 is a partial cross-sectional view of the cutting insert shown in FIG. 3a, taken along the line V-V.

As shown in FIG. 5, each primary relief surface 54 may be inclined at a positive acute first clearance angle δ1, and each insert side abutment surface 52 may be inclined at a positive acute second clearance angle δ2.

It should be appreciated that the first and second clearance angles δ1, δ2 are measured relative to an imaginary line parallel to the insert axis A1 at a cross-section taken in a third plane P3 containing the insert axis A1 and intersecting one of the four insert side surfaces 30, and the term "positive" signifies inclination of the primary relief surface 54 and the insert side abutment surface 52 towards the insert axis A1 as they extend away from the upper surface 22.

In some embodiments of the present invention, the first clearance angle δ1 may be greater than the second clearance angle δ2.

Attention is now drawn to FIGS. 6a to 6c and FIGS. 7a to 7c, showing cutting inserts 120, 220 in accordance with first and second further embodiments of the present invention, respectively, where the same reference numerals have been used for features that are common to those of the aforementioned cutting insert 20.

Figure 6A:
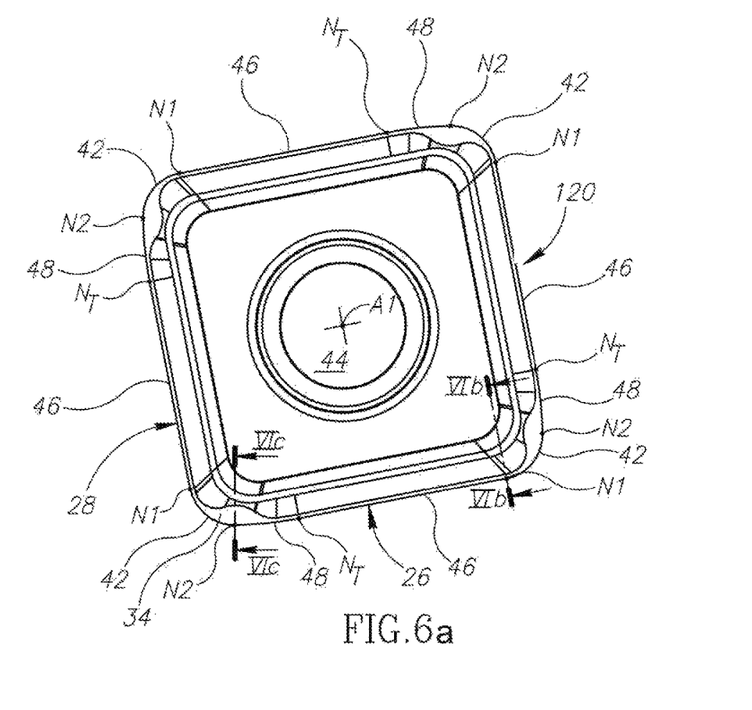
FIG. 6a is a top view of a cutting insert in accordance with a first further embodiment of the present invention.
Figure 6B:
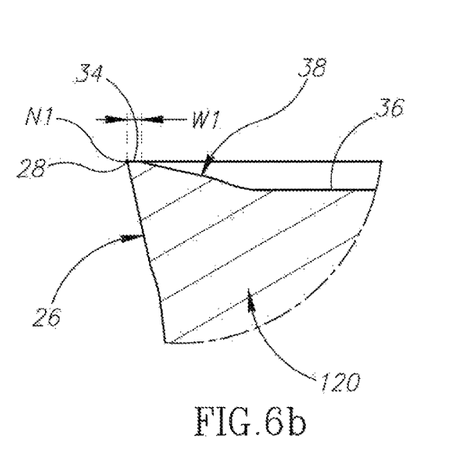
FIG. 6b is a partial cross-sectional view of the cutting insert shown in FIG. 6a, taken along the line VIb-VIb.
Figure 6C:
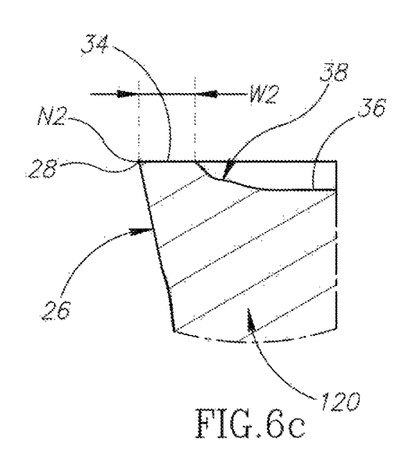
FIG. 6c is a partial cross-sectional view of the cutting insert shown in FIG. 6a, taken along the line VIc-VIc.

As shown in FIGS. 6b and 6c, the land surface 34 may have a first land width W1 at each first endpoint N1, and a second land width W2 at each second endpoint N2.

Figure 7A:
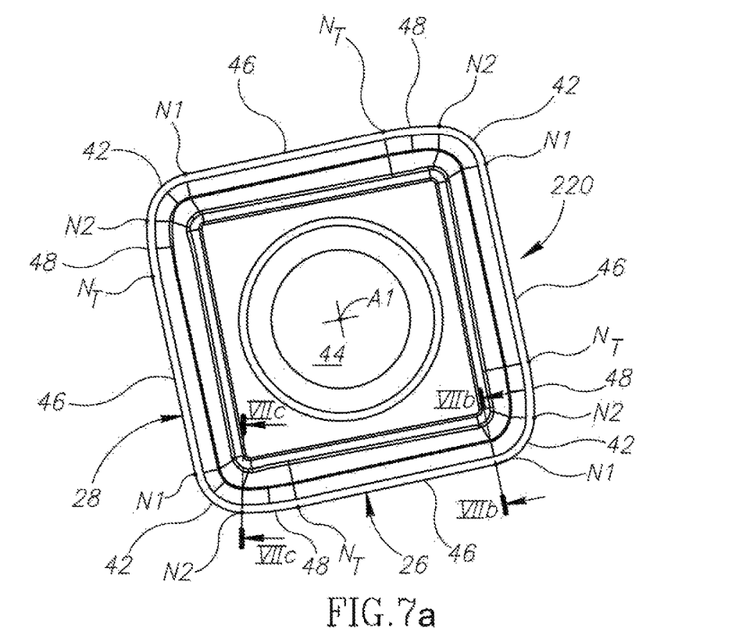
FIG. 7a is a top view of a cutting insert in accordance with a second further embodiment of the present invention.
Figure 7B:
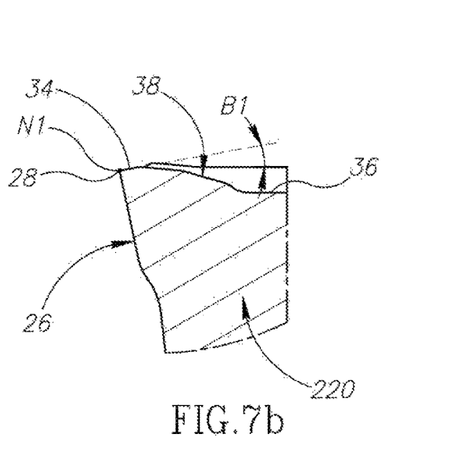
FIG. 7b is a partial cross-sectional view of the cutting insert shown in FIG. 7a, taken along the line VIIb-VIIb.
Figure 7C:
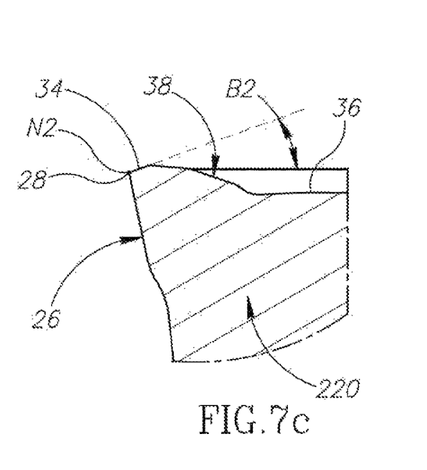
FIG. 7c is a partial cross-sectional view of the cutting insert shown in FIG. 7a, taken along the line VIIc-VIIc.

As shown in FIGS. 7b and 7c, the land surface 34 may have a zero or negative acute first land angle β1 at each first endpoint N1, and a zero or negative acute second land angle β2 at each second endpoint N2.

It should be appreciated that the first and second land angles β1, β2 are measured relative to an imaginary line perpendicular to the insert axis A1 at cross-sections taken along the upper peripheral edge 28 at the first and second endpoints N1, N2, respectively, and the term "negative" signifies inclination of the land surface 34 away from the lower surface 24 as it extends away from the upper peripheral edge 28.

In further embodiments of the present invention, either the second land width W2 may be greater than the first land width W1, or the second land angle β2 may be greater than the first land angle β1, or both.

Also in further embodiments of the present invention, the second land angle β2 may be at least 15 degrees greater than the first land angle β1, i.e. β2≥β1+15°.

For further embodiments of the present invention in which the second land angle W2 is greater than the first land angle W1, as shown in FIGS. 6b and 6c, each side cutting edge 40 is strengthened in the region of its second endpoint N2, thus providing a robust cutting insert 20 with prolonged service life, suitable for use in milling operations with high feed rates.

For further embodiments of the present invention in which the second land width β2 is greater than the first land width β1, as shown in FIGS. 7b and 7c, each side cutting edge 40 is strengthened in the region of its second endpoint N2, thus providing a robust cutting insert 20 with prolonged service life, suitable for use in milling operations with high feed rates.

Figure 8:
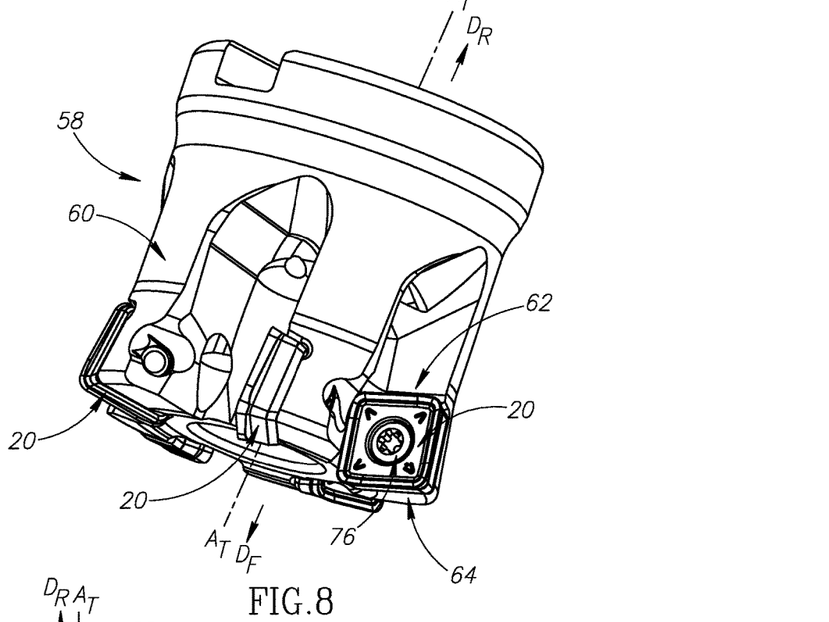
FIG. 8 is a perspective view of the cutting tool in accordance with some embodiments of the present invention.
Figure 9:
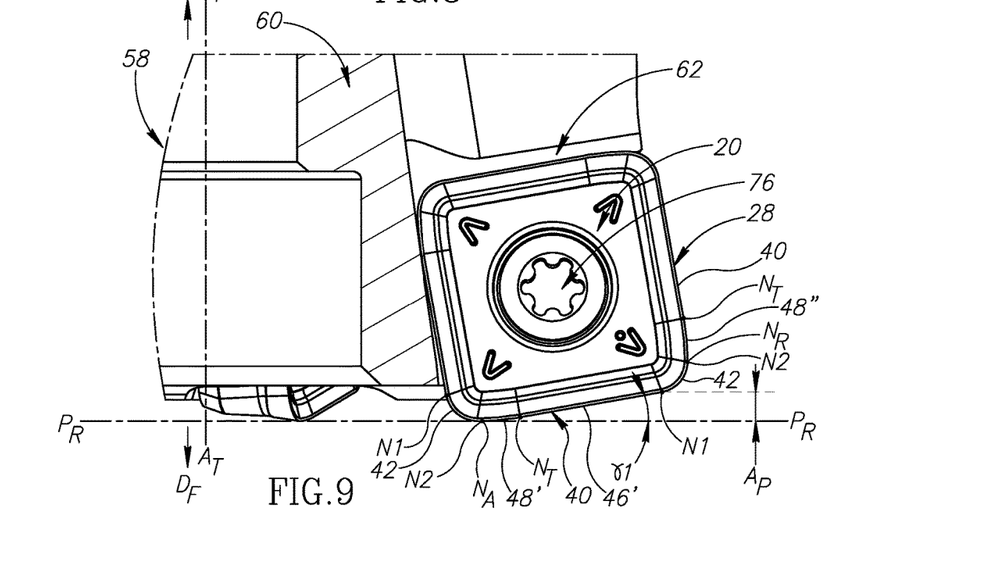
FIG. 9 is a detailed side view of the cutting tool shown in FIG. 8.
Figure 10:
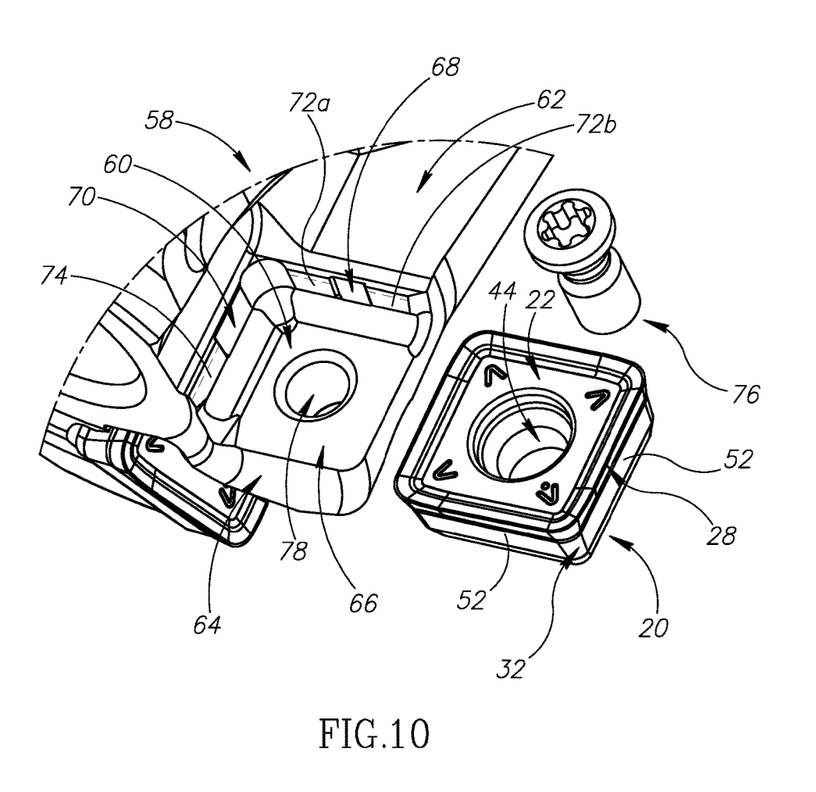
FIG. 10 is a detailed exploded perspective view of the cutting tool shown in FIG. 8.

As shown in FIGS. 8 to 10, a second aspect of the present invention relates to a rotary cutting tool 58 comprising a cutting body 60 and at least one of the aforementioned indexable cutting inserts 20. Each cutting insert 20 is removably secured in an insert receiving pocket 62 of the cutting body 60.

Although the cutting insert 20 in accordance with some embodiments of the present invention is included in FIGS. 8 to 10 and referred to below, it should be appreciated that the cutting inserts 120, 220 in accordance with the first and second further embodiments of the present invention are interchangeable therewith.

In some embodiments of the present invention, as shown in FIGS. 8 to 10, the cutting tool 58 may be rotatable about a tool axis $A_T$ defining a forward-rearward direction $D_F$, $D_R$, and each insert receiving pocket 62 may open out at a forward end surface 64 of the cutting body 60.

As shown in FIG. 9, an operative first of each insert's four secondary cutting edges 48' may contain an axially forwardmost point $N_A$ of its associated upper peripheral edge 28.

It should be appreciated that during some cutting operations, the axially forwardmost point $N_A$ of each insert's upper peripheral edge 28 may be subjected to significant axial cutting forces, and thus it is advantageous for the four secondary cutting edges 48 to be continuously curved and inherently strong.

Configuring the secondary cutting edges 48 to be continuously curved, also ensures that the axially forwardmost point $N_A$ of each upper peripheral edge 28 is reliably contained in its associated first secondary cutting edge 48' for embodiments of the present invention having wider manufacturing tolerances, for example, when each insert's peripheral surface 26 is devoid of ground surface portions.

Also, as shown in FIG. 9, an operative second of each insert's four secondary cutting edges 48" may contain a radially outermost point $N_R$ of its associated upper peripheral edge 28.

It should be appreciated that during some cutting operations, the radially outermost point $N_R$ of each insert's upper peripheral edge 28 may be subjected to significant radial cutting forces, and thus it is advantageous for the four secondary cutting edges 48 to be inherently strong.

Further as shown in FIG. 9, an operative first of each insert's four primary cutting edges 46', contained in the same side cutting edge 40 as the first operative secondary cutting edge 48', may be inclined at a lead angle γ1 to a radial plane $P_R$ perpendicular to the tool axis $A_T$.

In some embodiments of the present invention, the lead angle γ1 may be at least 5 degrees and at most 15 degrees, $5° \leq γ1 \leq 15°$.

As shown in FIG. 9, the axial distance between the first endpoint N1 of each insert's first operative primary cutting edge 46' and the axially forwardmost point $N_A$ of its associated upper peripheral edge 28 defines the insert cutting depth $A_P$.

It should be appreciated that for embodiments of the present invention in which the primary cutting length $L_P$ is greater than half the first side length Ls1, the lead angle γ1 is effective for most of the insert cutting depth $A_P$, thus advantageously producing cutting chips of uniform width.

In some embodiments of the present invention, the lead angle γ1 may be less than or equal to the primary cutting angle α1.

It should be appreciated that a maximum insert cutting depth $A_P$ is provided when the lead angle γ1 is equal to the primary cutting angle α1, and the second endpoint N2 of the first operative secondary cutting edge 48' is coincident with the axially forwardmost point $N_A$ of the upper peripheral edge 28.

As shown in FIG. 10, each insert receiving pocket 60 may have a base surface 66 and first and second pocket walls 68, 70 transverse to the base surface 66.

In some embodiments of the present invention, as shown in FIGS. 9 and 10, each first pocket wall 68 may face axially forwardly and include an axial support surface 72a, 72b, and each second pocket wall 70 may face radially outwardly and include a radial support surface 74.

Also in some embodiments of the present invention, each first pocket wall 68 may include two spaced apart axial support surfaces 72a, 72b.

As shown in FIG. 10, each cutting insert 20 may be removably secured in its insert receiving pocket 62 by means of a clamping screw 76 extending through its through bore 44 and threadingly engaging a screw bore 78 in the base surface 66.

In some embodiments of the present invention, a first insert side abutment surface 52 may abut against the first pocket wall's axial support surface 72a, 72b and a circumferentially adjacent second insert side abutment surface 52 may abut against the second pocket wall's radial support surface 74.

It should be appreciated that for embodiments of the present invention in which each first pocket wall 68 has two spaced apart axial support surfaces 72a, 72b and each second pocket wall 70 has a single radial support surface 74, abutting contact can be advantageously achieved at three contact zones along each insert's peripheral surface 26, resulting in stable mounting of each cutting insert 20 in its insert receiving pocket 62.

Also in some embodiments of the present invention, the second plane P2 may intersect the axial and radial support surfaces 72a, 72b; 74, as shown in FIG. 10 by means of three coplanar dashed lines extending along the axial and radial support surfaces 72a, 72b; 74.

It should be appreciated that for embodiments of the present invention in which the second plane P2 intersects the axial and radial support surfaces 72a, 72b; 74, and the imaginary first square S1 is rotationally offset from the imaginary third square S3, a greater flexibility of design is provided to stably mount same size cutting inserts 20 having different primary cutting angles α1 in the same insert receiving pocket 62.

It should also be appreciated that for embodiments of the present invention in which the second plane P2 is located closer to the first plane P1 than to the lower surface 24, and in the cross-section taken in the second plane P2 each insert side abutment surface 52 intersects two circumferentially adjacent insert corner surfaces 32, abutting contact can advantageously be achieved in the upper half of each insert's peripheral surface 26 at three contact zones located adjacent three of the four insert corner surfaces 32, resulting in stable mounting of each cutting insert 20 in its insert receiving pocket 62.

Although the present invention has been described to a certain degree of particularity, it should be understood that various alterations and modifications could be made without departing from the spirit or scope of the invention as hereinafter claimed.

What is claimed is:

1. An indexable cutting insert (20, 120, 220), comprising:
    opposing upper and lower surfaces (22, 24) with a peripheral surface (26) and an insert axis (A1) extending therebetween,
        the peripheral surface (26) intersecting the upper surface (22) to form a continuous upper peripheral edge (28), and including four insert side surfaces (30) alternating with four insert corner surfaces (32),
        each insert side surface (30) intersecting the upper surface (22) to form a side cutting edge (40), and each insert corner surface (32) intersecting the upper surface (22) to form a curved corner cutting edge (42),
    wherein each side cutting edge (40) includes a primary cutting edge (46) adjoining one of the corner cutting edges (42) at a first endpoint (N1) and a secondary cutting edge (48) adjoining another one of the corner cutting edges (42) at a second endpoint (N2),
    wherein in a top view of the cutting insert (20, 120, 220) along the insert axis (A1):
        the upper surface (22) is square-shaped with each of the four primary cutting edges (46) being straight, and the four primary cutting edges defining four sides of an imaginary first square (S1),
        each primary cutting edge (46) is tangential to its adjoining corner cutting edge (42), and
        each secondary cutting edge (48) is continuously curved and entirely located in a corresponding one of four imaginary quadrants (Q1, Q2, Q3, Q4) defined by two mutually perpendicular imaginary lines bisecting the imaginary first square's four sides, and
    wherein:
        each insert side surface (30) includes an insert side relief surface (50) intersecting the upper surface (22), and an insert side abutment surface (52) between the insert side relief surface (50) and the lower surface (24), and
        in a cross-section taken in a second plane (P2) perpendicular to the insert axis (A1) and intersecting the four insert side abutment surfaces (52), the four insert side abutment surfaces (52) define four sides of an imaginary third square (S3).

2. The cutting insert (20, 120, 220) according to claim 1, wherein:
    each corner cutting edge (42) is continuously curved and has a constant first radius of curvature (R1) and a first radial center point (C1),
    each continuously curved secondary cutting edge (48) has a constant second radius of curvature (R2), and
    the second radius of curvature (R2) is greater than the first radius of curvature (R1).

3. The cutting insert (20, 120, 220) according to claim 2, wherein the second radius of curvature (R2) is at least three times greater, and at most ten times greater, than the first radius of curvature (R1).

4. The cutting insert (20, 120, 220) according to claim 2, wherein in the top view:
    the four first radial center points (C1) define four corners of an imaginary second square (S2), and
    the imaginary first square (S1) is rotationally offset from the imaginary second square (S2) by a first offset angle (θ1).

5. The cutting insert (20, 120, 220) according to claim 1, wherein the imaginary first square (S1) is rotationally offset from the imaginary third square (S3) by a second offset angle (θ2).

6. The cutting insert (20, 120, 220) according to claim 1, wherein:
    each insert side relief surface (50) includes a primary relief surface (54) adjacent its associated primary cutting edge (46), and a secondary relief surface (56) adjacent its associated secondary cutting edge (48), and
    each primary relief surface (54) is planar, and each secondary relief surface (56) is convex.

7. The cutting insert (20, 120, 220) according to claim 1, wherein in the top view:

a first imaginary straight line (L1) contains one of the second endpoints (N2) and is tangential to both its associated secondary cutting edge (48) and also to the adjoining corner cutting edge (42), and the first imaginary line (L1) forms an acute primary cutting angle ($\alpha$1) with the primary cutting edge (46) contained in the same side cutting edge (40) as its associated secondary cutting edge (48).

8. The cutting insert (20, 120, 220) according to claim 7, wherein the primary cutting angle ($\alpha$1) is at least 5 degrees and at most 15 degrees.

9. The cutting insert (20, 120, 220) according to claim 1, wherein the entire upper peripheral edge (28) is contained in a first plane (P1).

10. The cutting insert (20, 120, 220) according to claim 1, wherein in the top view:

each primary cutting edge (46) tangentially adjoins the secondary cutting edge (48) contained in the same side cutting edge (40) at a transition point ($N_T$).

11. The cutting insert (20, 120, 220) according to claim 1, wherein:

each primary cutting edge (46) has a primary cutting length ($L_P$), each side of the imaginary first square (S1) has a first side length (Ls1), and the primary cutting length ($L_P$) is greater than half the first side length (Ls1).

12. The cutting insert (20, 120, 220) according to claim 1, wherein in the top view:

no portion of the upper peripheral edge (28) extends outside the imaginary first square (S1).

13. The cutting insert (20, 120, 220) according to claim 1, wherein the entire peripheral surface (26) is devoid of ground surface portions.

14. The cutting insert (20, 120, 220) according to claim 1, wherein in a side view of a given insert side surface (30):

at least a portion of the primary cutting edge (46) associated with a circumferentially adjacent first insert side surface (30) is visible, and at least a portion of the secondary cutting edge (48) associated with a circumferentially adjacent second insert side surface (30) is visible, the first and second insert side surfaces (30) being opposite one another.

15. The cutting insert (120, 220) according to claim 1, wherein:

the upper surface (22) includes a continuous land surface (34) intersecting the upper peripheral edge (28), the land surface (34) having a first land width (W1) and a zero or negative acute first land angle ($\beta$1) at each first endpoint (N1), and further having a second land width (W2) and a zero or negative acute second land angle ($\beta$2) at each second endpoint (N2), and either the second land width (W2) is greater than the first land width (W1), or the second land angle ($\beta$2) is greater than the first land angle ($\beta$1), or both.

16. A rotary cutting tool (58) rotatable about a tool axis ($A_T$) defining a forward-rearward rotation direction ($D_F$, $D_R$), and comprising:

a cutting body (60) having at least one insert receiving pocket (62); and at least one cutting insert (20, 120, 220) in accordance with claim 1 removably secured in the insert receiving pocket (62).

17. A rotary cutting tool (58) rotatable about a tool axis ($A_T$) defining a forward-rearward rotation direction ($D_F$, $D_R$), and comprising:

a cutting body (60) having at least one insert receiving pocket (62), each insert receiving pocket (62) opening out at a forward end surface (64) of the cutting body (60), and at least one cutting insert (20, 120, 220) removably secured in the insert receiving pocket (62), the cutting insert comprising:

opposing upper and lower surfaces (22, 24) with a peripheral surface (26) and an insert axis (A1) extending therebetween, the peripheral surface (26) intersecting the upper surface (22) to form a continuous upper peripheral edge (28), and including four insert side surfaces (30) alternating with four insert corner surfaces (32), each insert side surface (30) intersecting the upper surface (22) to form a side cutting edge (40), and each insert corner surface (32) intersecting the upper surface (22) to form a curved corner cutting edge (42), wherein each side cutting edge (40) includes a primary cutting edge (46) adjoining one of the corner cutting edges (42) at a first endpoint (N1) and a secondary cutting edge (48) adjoining another one of the corner cutting edges (42) at a second endpoint (N2), wherein in a top view of the cutting insert (20, 120, 220) along the insert axis (A1):

the upper surface (22) is square-shaped with each of the four primary cutting edges (46) being straight, and the four primary cutting edges defining four sides of an imaginary first square (S1), each primary cutting edge (46) is tangential to its adjoining corner cutting edge (42), and each secondary cutting edge (48) is continuously curved and entirely located in a corresponding one of four imaginary quadrants (Q1, Q2, Q3, Q4) defined by two mutually perpendicular imaginary lines bisecting the imaginary first square's four sides, and wherein:

a first operative secondary cutting edge (48') contains an axially forwardmost point ($N_A$) of its associated upper peripheral edge (28).

18. The cutting tool (58) according to claim 17, wherein:

a second operative secondary cutting edge (48") contains a radially outermost point ($N_R$) of its associated upper peripheral edge (28).

19. The cutting tool (58) according to claim 17, wherein:

a first operative primary cutting edge (46'), contained in the same side cutting edge (40) as the first operative secondary cutting edge (48'), is inclined at a lead angle ($\gamma$1) to a radial plane ($P_R$) perpendicular to the tool axis ($A_T$), and the lead angle ($\gamma$1) is at least 5 degrees and at most 15 degrees.

20. The cutting tool (58) according to claim 17, wherein:

each insert receiving pocket (62) has a base surface (66) and first and second pocket walls (68, 70) transverse thereto, the first pocket wall (68) having an axial support surface (72a, 72b) and the second pocket wall (70) having a radial support surface (74), each insert side surface (30) includes an insert side relief surface (50) intersecting the upper surface (22), and an insert side abutment surface (52) between the insert side relief surface (50) and the lower surface (24), and a first insert side abutment surface (52) abuts against the first pocket wall's axial support surface (72a, 72b) and a circumferentially adjacent second insert side abutment surface (52) abuts against the second pocket wall's radial support surface (74).

21. The cutting tool (58) according to claim 20, wherein:
in a cross-section taken in a second plane (P2) perpendicular to the insert axis (A1) and intersecting the four insert side abutment surfaces (52), the four side insert abutment surfaces (52) define four sides of an imaginary third square (S3),
the imaginary first square (S1) is rotationally offset from the imaginary third square (S3) by a second offset angle (α2), and
the second plane (P2) intersects the axial and radial support surfaces (72a, 72b; 74).

22. The cutting tool (58) according to claim 21, wherein:
the entire upper peripheral edge (28) is contained in a first plane (P1),
the second plane (P2) is located closer to the first plane (P1) than to the lower surface (24), and
in the cross-section taken in the second plane (P2), each insert side abutment surface (52) intersects two circumferentially adjacent insert corner surfaces (32).

23. An indexable cutting insert (20, 120, 220), comprising:
opposing upper and lower surfaces (22, 24) with a peripheral surface (26) and an insert axis (A1) extending therebetween,
the peripheral surface (26) intersecting the upper surface (22) to form a continuous upper peripheral edge (28), and including four insert side surfaces (30) alternating with four insert corner surfaces (32),
each insert side surface (30) intersecting the upper surface (22) to form a side cutting edge (40), and
each insert corner surface (32) intersecting the upper surface (22) to form a curved corner cutting edge (42),
wherein each side cutting edge (40) includes a primary cutting edge (46) adjoining one of the corner cutting edges (42) at a first endpoint (N1) and a secondary cutting edge (48) adjoining another one of the corner cutting edges (42) at a second endpoint (N2),
wherein in a top view of the cutting insert (20, 120, 220) along the insert axis (A1):
the upper surface (22) is square-shaped with each of the four primary cutting edges (46) being straight, and the four primary cutting edges defining four sides of an imaginary first square (S1),
each primary cutting edge (46) is tangential to its adjoining corner cutting edge (42), and
each secondary cutting edge (48) is continuously curved and entirely located in a corresponding one of four imaginary quadrants (Q1, Q2, Q3, Q4) defined by two mutually perpendicular imaginary lines bisecting the imaginary first square's four sides, and
wherein the four primary cutting edges (46) are all contained in a first plane (P1).

24. The cutting insert (20, 120, 220) according to claim 23, wherein:
the four side cutting edges (40) are all contained in the first plane (P1).

25. The cutting insert (20, 120, 220) according to claim 23, wherein:
the entire upper peripheral edge (28) is contained in the first plane (P1).

* * * * *